United States Patent [19]

Schmalz et al.

[11] 3,954,900

[45] May 4, 1976

[54] HEAT HARDENING MIXTURES

[75] Inventors: Wolfgang Schmalz, Wiesbaden; Walter Michel, Frankfurt am Main; Manfred Schön, Dudenhofen, all of Germany

[73] Assignee: Cassella Farbwerke Mainkur Atiengesellschaft, Germany

[22] Filed: Mar. 24, 1975

[21] Appl. No.: 561,438

[30] Foreign Application Priority Data

Mar. 26, 1974  Germany............................ 2414427

[52] U.S. Cl. .............................. 260/850; 260/39 R; 260/77.5 TB; 260/249.6; 260/249.7 R
[51] Int. Cl.² .................... C08L 61/28; C08L 67/02
[58] Field of Search............. 260/850, 841, 77.5 TB, 260/39 R

[56] References Cited

UNITED STATES PATENTS

| | | | |
|---|---|---|---|
| 3,597,495 | 8/1971 | Sekmakas et al. | 260/850 |
| 3,822,240 | 7/1974 | Schmitt et al. | 260/77.5 TB |

*Primary Examiner*—Murray Tillman
*Assistant Examiner*—J. Ziegler
*Attorney, Agent, or Firm*—Connolly and Hutz

[57] ABSTRACT

High quality coatings and the like are formed from dispersions in a reactive liquid of finely divided solid isocyanated polyester resin having isocyanate groups part of which are masked but become unmasked upon heating and then react with the liquid. The liquid is essentially one or more highly etherified methylolated aminotriazine in which some of etherifying is with alkoxyethyl groups that provide relatively low viscosity and good reactivity.

14 Claims, No Drawings

HEAT HARDENING MIXTURES

The present invention relates to heat hardenable compositions such as those used for coating metal and other objects.

Among the objects of the present invention is the provision of novel flowable compositions that are well suited for curing into hard, stable products.

The foregoing as well as additional objects of the present invention are more fully discussed in the following description of several of its exemplifications.

According to the present invention, very effective hardened products are made from a dispersion of a finely divided solid resin in a liquid etherified methylolaminotriazine in which the degree of methylolation averages at least about 50 percent, the degree of etherification of the methylol groups averages at least about 70%, and about 20 to 80 mol percent of the etherifying groups are alkyl groups with up to 2 carbon atoms, the remaining etherifying groups being alkoxyethyl groups having alkoxy moieties with up to 4 carbon atoms, the resin being an uncured mixture of about 30 to about 45% by weight of a polyester condensate with an average molecular weight of about 500 to about 6000, an acid number below about 20, an OH number about 400 to about 800 and a softening temperature about 80° to about 150°C, the balance of the resin being essentially a polyurethane-forming polyisocyanate at least about half of whose isocyanate groups are masked with a lactam-masking agent that unmasks on heating to curing temperature, the polyester condensate being essentially the polyester of (a) a mixture of isophthalic and terephthalic acids in which about 10 to about 90 mol percent is isophthalic acid, and (b) at least one saturated aliphatic polyol having 4 to 6 OH groups, and the resin being present in an amount from about 20 to about 500% by weight of the liquid.

Preferred polyesters in the foregoing dispersion have molecular weights from about 1200 to about 2500, or acid numbers from about 1 to about 5 or OH numbers from about 600 to about 700, or combinations of any two or all three of these characteristics.

At least one alkylene glycol whose hydroxyl groups are on non-adjacent carbons can also be esterified in the polyester of the present invention, to the extent such glycols are not over about 30 mol percent of the total polyol.

The dispersions of the present invention can also contain one or more urethane-forming accelerators, as well as one or more pigments such as those used in conventional paints.

The polyesters of the present invention can be made in any desired manner as for example by conventional heating of the esterifying ingredients, or of transesterifying sources of those ingredients, usually at temperatures of 220° to 240°C or higher, and desirably in an inert atmosphere such as a stream of nitrogen.

In place of the iso and terephthalic acid there may be employed esters thereof containing an alcohol component. This component can be trans-esterified under the same conditions as the polyester is made, viz. by means of the aliphatic polyols having 4 to 6 OH-groups or by means of the aliphatic glycol whose hydroxyl groups are separated from each other by at least 3 carbon atoms. There are mainly esters of the iso and terephthalic acid with alcohol components bearing 4 carbon atoms, such as dimethyl-iso or terephthalate, diethyl-iso or terephthalate, di-(n-propyl)-iso- or terephthalate, di-(isobutyl)-iso or terephthalate.

Polyesters of the iso or terephthalic acid may also be trans-esterified, such as the polyethylene glycolterephthalate that may be employed, for instance in the form of waste products.

The esterification or the transesterification is continued until the polyester has been formed with the desired properties, something which requires reaction times of up to 20–30 hours. Suitable catalysts may also be used for facilitating the esterification or ester interchange. Catalysts for facilitating the esterification are acids, for example, like phosphoric acid or the like, catalysts for facilitating the transesterification and salts such as zinc, manganese or calcium acetate, for example, and esters of titanium acid. The esterification or ester interchange catalysts may be employed in quantities of 100 – 500 ppm, referring to the solid resin.

Starting products for the necessary polyester, aside from the composition of iso and terephthalic acid or esters of iso or terephthalic acid such as the lower alkyl esters, are saturated aliphatic polyols with 4 to 6 OH groups and optionally also aliphatic glycols whose hydroxyl groups are separated from each other by at least 3 carbon atoms. Sorbitol, pentaerythritol and dipentearythrol are examples of suitable polyols although other can be used. Pentaerythritol is particularly preferred. As the aliphatic saturated glycols whose hydroxyl groups are separated from each other by at least 3 carbon atoms, the following may be used: hexandiol-1,3; hexandiol-1,4; hexandiol-1,5; hexandiol-1,6; butandiol-1,3; butandiol-1,4; pentandiol-1,3; pentandiol-1,5; propandiol-1,3. The use of hexandiol-1,6 is preferred, particularly with pentaerythritol.

In the preparation of the polyester, the selection of the individual constituents in relation to each other allows the setting of the desired melting temperature of the polyester. Thus, in using dipentaerythritol, for example, particularly high-melting polyesters are obtained while in using hexandiol-1,6, the melting point is lowered but the flexibility of the system is increased. Very generally, it may be said that within a combination of constituents yielding carboxyl and hydroxyl groups, the melting temperature rises with an increasing OH number. The polyester-producing ingredients may be varied within wide ranges without running into an incompatibility with the remaining constituents.

A preferred polyester with an average molecular weight of 1200 to 2500, an acid number of 1 to 5, an OH number of 400 to 800, for example, is obtained by the esterification of a composition consisting of iso and terephthalic acid in a weight ratio of 1 : 1, with a composition consisting of 80% pentaerythritol and 20% hexandiol-1,6.

The numerical values given for the acid and OH numbers indicate the number of milligrams of potassium hydroxide which are consumed in the titration of a gram of the polyester. These are customary in the characterization of a polyester, and can be determined by the methods given, for example, in Houben-Weyl: "Methoden der Organischen Chemie", Fourth Edition, Vol. XIV/2 (1963), pages 17–18.

The polyisocyanate constituent of the present invention is an aliphatic, cycloaliphatic or aromatic di-, tri- or tetraisocyanate at least half of whose isocyanate groups are masked by a lactam or by lactams, that unmask at the elevated temperatures used for curing the composition. Suitable polyisocyanates are, for example, hexamethylene diisocyanate, 3-isocyanatomethyl-3,5,5-trimethylcyclohexylisocyanate, dicyclohexylmethane-4,4'-diisocyanate, methylcyclohexylene-2,4-diisocyanate, toluylene diisocyanate, xylylene diisocyanate, diphenylmethane-4,4'-diisocyanate and the polyisocyanate which contain biuret groups, prepared by reacting 3 mols hexamethylene diisocyanate with one mol water. The use of hexamethylene diisocyanate is preferred. Butyrolactam, γ-pyrrolidone, δ-piperidone and 7-enantholactam, for example, are well known masking lactams that may be used but ε-caprolactam is preferred.

The lactam-masked polyisocyanate is prepared by the joint heating of both constituents (polyisocyanate and lactam) to 100° to 120°C, in which case, as a result of an exothermic reaction, the temperature may rise to 120°C – 180°C, according to the size of the mixture and the number of the reacting isocyanate groups. At least half of the existing isocyanate groups should be masked in order to give the final dispersion good flowability. After cooling the masking mixture to about 120°C, the previously prepared polyester is added, non-masked isocyanate groups eventually reacting with hydroxyl groups of the polyester, so that the resin composition no longer contains any free isocyanate groups after the cooling.

One or more accelerators can be added to the molten resin composition suitably toward the end of the preparation process, optionally together with the other additives such as fillers, e.g. barium sulfate, chalk, pigments, e.g. titanium dioxide, lead chromate, lead molybdate, carbon black, thixotropic agents, e.g. colloidal silicic acid. Upon solidification, the resin composition is disintegrated to a grain size of ca. 50 – 100 $\mu$, something which may be accomplished by milling or sieving. However the accelerator may be added later to the dispersion, if desired, as can the fillers, pigments, thixotropic agents and the like. The accelerators can be standard polyurethane-forming accelerators or catalysts, and may for example be a tertiary amine, a salt of a tertiary amine with an organic acid, an organophile metal salt or a metal complex, or combinations of these materials.

A suitable tertiary amine is N,N'-endoethylene piperazine, for example. Suitable organophile metal salts are zinc chloride, tin (II) chloride and tin isooctoate, for example, and suitable metal complexes are iron or tin acetylacetonate, dibutyl tin dilaurate and molybdenum glycolate, for example. Particularly good cured coatings are obtained when dibutyl tin dilaurate is used as the accelerator, and it is accordingly preferred.

The liquid phase of the dispersions of the present invention is the same as that described in the related U.S. patent application filed concurrently herewith and carrying docket insignia "Ref. 3000". As described in that application, the liquid phase is etherified methylolaminotriazine and has specific viscosities which are lower by about a factor of 10 than the specific viscosities of comparable prior art reactive etherified methylolaminotriazines, yet have very good reactivity and yield hardened products that show excellent technical properties, such as high resistance to mechanical stresses and chemicals, high elasticity and high luster.

Preferred are such etherified methylolaminotriazines wherein the aminotriazine is melamine. The degree of methylolation of the aminotriazines, preferably of the melamine, averages at least about 50% and preferably above about 75%. This means that at least about 50%, and preferably above about 75%, of the hydrogen atoms of the amino groups of the aminotriazines are substituted by methylol groups. At least about 70% of the methylol groups are etherified, about 20 to about 80 mol percent of the etherifying groups being methyl or ethyl groups, the remainder alkoxyethyl groups wherein the alkoxy group may have 1 to 4 carbon atoms. The given percentages of the degree of methylolation or etherification and the mol percentages of the composition of the etherifying groups are statistical or average values of the individual values of all chemical entities contained in the etherified methylol-aminotriazines. Examples of etherifying alkoxyethyl groups are: methoxyethyl, ethoxyethyl, n-propoxyethyl, isopropoxyethyl, n-butoxyethyl, sec.-butoxyethyl, isobutoxyethyl, and tert-butoxyethyl. Preferred are methoxyethyl, ethoxyethyl and n-butoxyethyl.

Pentamethylolmelamine and hexamethylolmelamine are of particular effectiveness, and can be added as pure compounds or as technical grades of such compounds to alkoxyethylated aminotriazines to make the liquid phase of the present invention. Pure compounds such as tri-n-butoxyethoxymethyl-trimethoxymethyl melamine can even be used as the liquid phase without being mixed with other aminotriazines.

The liquid phase is fully or partially miscible with water, well compatible with aromatic hydrocarbons, limitedly compatible with aromatic hydrocarbons and limitedly compatible with aliphatic hydrocarbons. Compatibility with aliphatic hydrocarbons may be increased considerably if to the etherified methylolaminotriazines there are added lower aliphatic alcohols such as ethanol, propanol, isopropanol, but preferably butanol.

The preparation of etherified methylolaminotriazines takes place in a manner known per se, e.g. by the partial reetherizing of the alkyl-etherified methylolaminotriazines or by the etherification of the methylolaminotriazines with the appropriate hydroxyl compounds, in the presence of acids, such as mineral acids (nitric acid, sulfuric acid, phosphoric acid, etc.). Such etherifying hydroxyl compounds are best used in excess, and upon reaching the desired degree of re-etherification or etherification, the acid acting as a catalyst is neutralized, and the excess etherifying compound distilled off in vacuum. It is not essential to completely remove the excess of the etherifying hydroxyl compound, and a content up to 10% by weight of such compound in the liquid phase does no particular harm. A further reduction of that content has no technical advantages and requires special technical equipment, such as a vacuum thin-film evaporator.

The analytical determination of the characteristic parameters of the triazines can be determined by conventional methods, as described for example in "Analytical Chemistry for Polymers" by Gordon M. Kline, ed., Analytical Chemistry of Polymers, Part 1, Vol. 12 of H. Mark, C. S. Marvel, H. W. Melville, P. J. Flory, eds., High Polymers, Interscience Publishers, Inc., New York, 1959, Chapter 3, pp. 49–95. Here, the analysis sample is hydrolyzed, one molecule formaldehyde resulting per etherified and unetherified methyl group and one molecule of the ether-forming alcohol per etherified methylol group.

Generally, for the degree of methylolation M,

-continued $$M [\%] = \frac{100 f}{2a}$$

wherein $a$ is the number of the amino groups in the aminotriazine employed and $f$ is the number of the analytically ascertained mols formaldehyde per mol aminotriazine.

For the degree of etherification V [%], $$V [\%] = \frac{100 (n + m)}{f}$$

wherein $n$ and $m$ are the mol numbers of the ether-forming alkyl or alkoxyethyl groups per mol aminotriazines analytically ascertained.

The novel dispersions of the present invention normally contain about 2 to about 500% by weight, and preferably about 30 to about 250% by weight, of a solid resin composition, based on the weight of the liquid phase of the dispersion. For the preparation of the dispersion, the resin composition, disintegrated to a grain size of ca. 50 – 100 μ, is added to the liquid phase and then finely dispersed therein in a manner known per se. For the dispersion, the mills customary in the lacquer industry may be employed, e.g. sand or bead mills, balls mills, dissolvers or attrition devices.

As mentioned above, the liquid phase may have other additives such as fillers, pigments, thixotropic agents and the like added to it before the solid resin phase is added.

For the preparation of protective coatings, the novel dispersion is applied to the substrate to be coated by any application technique, e.g. brushing, rolling, knife-coating or spraying. Spraying may take place hot or cold, with or without compressed air, or electrostatically. Some spraying processes require a very low viscosity for the material being sprayed, and for this purpose small amounts of solvent or thinning agents can be added to dissolve the liquid phase but not the solid phase of the dispersions. Alcohols such as methanol, ethanol, propanol and the butanols are suitable solvents, and water may also be suitable where it does not harm the substrate and completely dissolves. Aliphatic petroleum hydrocarbons to the extent of not more than about 30% by weight can also be present in the liquid phase as added diluent. Readily volatile solvents are preferred, such as those which evaporate at 1/30 the evaporation rate of diethyl ether, or faster.

Only a relatively small amount of thinning solvent is required, since only the liquid phase of the dispersion is thinned, the solid phase remaining undissolved.

Brushing also has similar viscosity requirements and in general the thinning solvents for spraying or brushing need be no more than equal the weight of the etherified methylol aminotriazines.

Without the thinning, the liquid etherified methylol aminotriazines have a viscosity of from about 90 to about 1000 centipoises at 25°C, preferably about 100 to about 200 centipoises at that temperature. After thinning the entire dispersion including the suspended resin solids, has a viscosity of 50 to 200 centipoises, preferably of 50 to 100 centipoises.

The coating is produced by heating the applied dispersion to temperatures normally between 150° and 250°C, and preferably 170°-200°C; the baking times normally last 10–60 minutes, and preferably 20–40 minutes.

The novel coating dispersions have very good flowability, which upon baking yield homogeneous coatings with outstandingly smooth, high-gloss surfaces. Having a good hardness, the coatings at the same time are elastic and have a good resistance to weather, temperatures and chemicals. These properties were unexpected.

The invention is described in more detail by way of the following examples, some of which relate to the preparation of the liquid phase, some to the preparation of the polyester, some to the preparation of the lactam-masked isocyanate constituents, and others to the preparation of the dispersions.

EXAMPLE 1

700 parts by weight* of a hexamethylolmelamine with 92% methyl-etherified methylol groups are dissolved in 1520 pbw ethylene glycol monomethyl ether and mixed at 32°C with 28 pbw nitric acid ($d = 1.4$). The resulting mixture is then agitated for 35 minutes at 35°C and then standardized with about 25 pbw soda lye of 50° Be to a pH value of 8.5. The product, now in solution form, is evaporated in vacuum (about 40 mm mercury) at 40°–100°C and then freed of precipitated sodium nitrate by filtration. Obtained were 960 pbw of a colorless, clear liquid with a viscosity of 190 cp at 25°C.

Analysis: per mol melamine, 5.9 mols formaldehyde, 3.1 mols $OCH_3$, 2.8 mols $OC_2H_4OCH_3$.

*hereinafter "pbw".

EXAMPLE 2

The procedure was as in Example 1, only in place of 1520 pbw ethylene glycol monomethyl ether, 1800 pbw ethylene glycol monoethyl ether are used and the quantity of nitric acid used is raised to 31 pbw. A correspondingly larger quantity of soda lye is used for neutralizing the acid. After evaporation and filtration, 1000 pbw mixed ether are obtained. Its viscosity is 100 cp at 25°C.

Analysis: per mol melamine, 5.8 mols formaldehyde, 3.3 mols $OCH_3$, 2.1 mols $OC_2H_4OC_2H_5$.

EXAMPLE 3

In a reaction vessel provided with a stirrer, a reflux condenser and a gas inlet tube, 626 pbw pentaerythritol and 137 pbw hexanediol-1,6 are melted (79.86 mol percent pentaerythritol and 20.14 mol percent hexandiol-1,6), then a nitrogen stream is passed through the vessel and 500 pbw of a composition of 70 mol percent isophthalic acid and 30 mol percent terephthalic acid is introduced. The reaction composition is then heated to 220° – 240°C with stirring and without stopping the nitrogen flow. After about 20 hours, a clear, yellowish melt results. Its acid number is 1–2, its OH number 620, its average molecular weight (determined cryoscopically) is 1200, and its softening temperature, determined on the Kofler bench, is 85°C. The product is cooled and ground to prepare it for dispersing.

The Kofler bench measurement is described in Kofler "Chemie-Ingenieur-Technik" 1950, page 289.

EXAMPLE 4

In a reaction vessel provided with a stirrer, a short distillation column, a gas inlet tube, and a vacuum connection, 1252 pbw of pentaerythritol and 272 pbw hexanediol-1,6 are melted (82 mol percent pentaerythritol and 18 mol percent hexanediol-1,6) and then 576 pbw unpigmented polyethylene glycol terephthalate are introduced. Stirring is continued at 220°C under evacuation at 500–300 mm pressure until 184 pbw ethylene glycol are distilled off. Then the column is removed, a reflux condenser is mounted directly in the reaction vessel, 500 pbw pure isophthalic acid are added (to provide an equimolar mixture of isophthalic acid and terephthalic acid moieties), and stirring continued under nitrogen with the vessel contents heated to 240°C until the acid number is at 3 and the OH number is at 634. The product is then cooled and disintegrated. Softening range: (Kofler heating bench) 85°–90°C. Average molecular weight (cryoscopically determined): 1450.

EXAMPLE 5

Into the reaction vessel described in Example 3 are introduced:

855 g pentaerythritol
184 g hexanediol-1,6, melted
582 g dimethylterephthalate and
0.3 g zinc acetate (82.3 mol percent pentaerythritol and 17.7 mol percent hexanediol-1,6).

Heating proceeds to 230°C with stirring until about 180 pbw methanol has been distilled off. The pressure may be reduced to 500 – 300 mg mercury to speed up this distillation. Then 250 pbw isophthalic acid are introduced (to produce a reaction mixture of 34 mol percent isophthalic acid and 66 mol percent terephthalic acid) and it is further refluxed with stirring until the acid number of the substance is at 1 and the OH number at 650, at which point the temperature of the reaction composition reaches 240°C. The product is poured onto a metal sheet and disintegrated upon cooling. Molecular weight (cryoscopically determined): 1520 – 1540. Softening range (determined on the Kofler heating bench): 70°–77°C.

EXAMPLE 6

Into a reaction vessel with stirrer are placed 37.3 pbw ε-caprolactam which is stirred and heated to 120°C to melt this ingredient. To the melt are added dropwise 27.7 pbw hexamethylene diisocyanate (molar ratio 2 : 1) in such a manner that the melt temperature does not exceed 130°C. Then 35 pbw of the polyester prepared in accordance with Example 3, 2 pbw dibutyl tin dilaurate, and 35 pbw titanium dioxide pigment are added, and the mixture stirred further for one hour at 100°C. A viscous mass is obtained upon cooling, becoming solid and millable after some time. The hexamethylene diisocyanate may be substituted by equal molar quantities of methylcyclohexylene-2,4-diisocyanate or toluylene diisocyanate, for example.

EXAMPLE 7

43.1 pbw 3-isocyanatomethyl-3,5,5-trimethylcyclohexylisocyanate and 21.9 pbw ε-caprolactam (molar ratio 1 : 1) are heated at a bath temperature of 100°C. The mixture temperature rises during the reaction to 130°C. When the resulting melt has cooled to a temperature of 100°C, 35 pbw of the polyester of Example 4, 1.8 pbw dibutyl tin dilaurate, and 35 pbw titanium dioxide pigment are added and the mass stirred 30 minutes at 110°C. Upon cooling, a viscous mass is obtained at first, which after some time becomes millable.

EXAMPLE 8

100 pbw of the mixed ether of hexamethylolmelamine described in Example 1, are placed in a sturdy stirring vessel provided with a toothed disk stirrer. During stirring at 700 rpm, there is added 350 g of the resin composition prepared as in Example 6 but using the polyester of Example 4, the resin being ground to a grain size of about 50 – 100 μ. After a good dispersion by a ½-hour stirring, the dispersion is placed in a ball mill, where after a one-day homogenization, it is ready for coating use. The particle size of the dispersed solid phase is now well below 100 μ. The dispersion is spread on a steel sheet, the gap width of the spreader being 100 μ. The coating layer thus spread is baked for 30 minutes at 180°C. There results a uniform, high-glossy, white film having a thickness of 60 – 70 μ and the following properties:

| | |
|---|---|
| Erichsen cupping (DIN 53,156) | 7 mm |
| Cross-cut (DIN 53,151) | 0 |
| Degree of gloss according to Lange, 45° optics | 100% |
| Impact test according to Gardner (ASTM D 2794-69) | 0.4 kp.m |
| Pendulum hardness (DIN 53,157- see also p. 380 of the Ullmanns Encyklopadie cited below) | 160 seconds |
| Weather stability in Weather-o-meter (unfiltered carbon arc, 17-3 cycle) ASTM D 822; gloss retained after 500 hours | 92% |
| Xylene test of Ford (ASTM D 1308-57) (No evidence means no attack after 15 minutes) | No evidence |

The Erichsen and cross-cut measuring standards are described in Ullmanns Encyklopadie der Technischen Chemie, 3rd Ed., Vol. 11 (1960), pages 378–379.

EXAMPLE 9

65 pbw hexamethylene diisocyanate, whose isocyanate groups are completely masked with ε-caprolactam, are melted at 120°C with 35 pbw of the polyester of Example 4, and 2 pbw dibutyl tin dilaurate are added. After about a one-hour stirring, the molten mixture is cooled and after solidification, disintegrated to a particle size of 50 – 100 μ. Of this granulate, 400 pbw are introduced during stirring with a sturdy toothed disk into 100 pbw of the mixed ether of hexamethylolmelamine described in Example 1, and the combination milled one day in a ball mill. The then complete dispersion (the particle size of the dispersed resin mixture is now below 100 μ) is standardized with about 30 pbw butanol to an outflow time of 30 seconds (4 DIN 53,211, 20°C) and applied to a steel sheet by means of an air-operated spray gun. The steel sheet thus lacquered is subsequently baked for 30 minutes at 180°C. The result is a clear lacquer coating of about 25 μ dry film thickness and the following properties:

| | |
|---|---|
| Pendulum hardness (DIN 53,157) | 172 seconds |
| Erichsen cupping (DIN 53,156) | 10 mm |
| Cross-cut (DIN 53,151) | 0 |
| Impact test of Gardner | > 0.9 kp.m |
| Xylene test of Ford (No evidence means no attack after 15 minutes) | No evidence |

The film is completely homogeneous and very brilliant.

EXAMPLE 10

100 pbw of the mixed ether of hexamethylolmelamine described in Example 2 are mixed with 50 pbw titanium dioxide pigment of the rutile type and 2 pbw commercial silica thixotroping agent sold under the name Thixseal 435 by Lehmann, Voss & Co., Hamburg (Germany), or any other brand, and the mixture milled on a three-roll mill until uniform. The resulting paste is placed in a stirring unit having a toothed disk stirrer and mixed at 700 rpm with 200 pbw of 50 – 100 $\mu$ sized particles of a resin prepared as in Example 6 from a melt of 130 pbw completely $\epsilon$-caprolactam-masked hexamethylene diisocyanate with 70 pbw of the polyester of Example 3 and with 4 pbw dibutyl tin dilaurate. The stirring is continued until the mixture is uniform after which the mixture is ball-milled for 24 hours to reduce the particle size of the dispersed resin to below 70 $\mu$. The final dispersion is sprayed with an airless gun onto a steel sheet and then baked for 30 minutes at 180°C. The result is a hard, elastic film, which does not show runs even when the spraying is onto a vertical surface, and has a 40 $\mu$ dry film thickness along with the following properties:

| | |
|---|---|
| Pendulum hardness (DIN 53,157) | 178 seconds |
| Erichsen cupping (DIN 53,156) | 7.2 mm |
| Cross-cut (DIN 53,151) | 0 |
| Impact test of Gardner | 0.4 kp.m |
| Xylene test of Ford (No evidence means no attack after 15 minutes) | No evidence |
| Degree of gloss of Lange, 45° optics 85% | |

EXAMPLE 11

Into a reaction vessel with stirrer are placed 37.3 pbw $\epsilon$-caprolactam and heated with stirring to 120°C. To the melt that results there are added dropwise 27.7 pbw hexamethylene diisocyanate (corresponds to a mol ratio of 2 : 1) in such a manner that the mix temperature does not exceed 130°C. Then 35 pbw of a polyester prepared in accordance with Example 3, as well as 2 pbw dibutyl tin dilaurate and 100 pbw titanium dioxide pigment (rutile type) are added at 100°C and the mixture vigorously stirred for 2 hours. The mixture is then permitted to cool below 120°C with continued stirring. It becomes too viscous at 70°C and is then poured onto a sheet where it solidifies and may then be milled to a grain size of under 100 $\mu$. There is separately prepared a paste of 100 pbw of the mixed ether of hexamethylolmelamine described in Example 1, 50 pbw titanium dioxide pigment (rutile type) and 5 pbw pyrogenic silicic acid in extremely fine particle size, e.g. Aerosil 200 sold by DEGUSSA Company, Frankfurt/Main, Germany. The resulting paste is milled in a three-roll mill to a particle fineness of below 5 $\mu$ and subsequently the above-mentioned milled solid resin is dispersed into the paste with stirring. The resulting coating dispersion is rolled onto a steel sheet with a lacquering roller and baked for 30 minutes at 180°C. The cured coating thus produced is a white, satin-frosted coating having a very good weather stability. It has the following superior properties for a coating applied without solvents:

| | |
|---|---|
| Pendulum hardness (DIN 53,157) | 192 seconds |
| Erichsen cupping (DIN 53,156) | 6.4 mm |
| Impact strength of Gardner | 0.3 kp. m |
| Cross-cut (DIN 53,151) | 0 |
| Degree of gloss of Lange, 45° optics | 35% |
| Xylene test of Ford (No evidence means no attack after 15 minutes) | No evidence |

The cured coatings of the present invention are of more complex composition and of substantially higher quality than the similar cured coatings of the above-identified concurrently filed patent application. Thus the masking agents used in the coatings of the present invention are generally not completely volatilized by the curing heat, so that they are still present in significant amounts in the cured coatings. No priming coat is needed inasmuch as these coatings protect carbon steel and other metals exceedingly well. They can be used for automobile body painting, for instance, but here previously applied conventional priming paints or washes are desirable to better inhibit corrosion at locations where the top coating may become damaged.

Although the freshly-applied coatings of the present invention begin to cure at temperatures of about 140°C, or even somewhat lower, they can be easily applied at temperatures up to 100°C, as by spraying, knife-coating and even hot-dipping. At such elevated temperatures the viscosity of the uncured coating compositions are diminished so that little or no thinning solvents are needed.

Obviously many modifications and variations of the present invention are possible in the light of the above teachings. It is, therefore, to be understood that within the scope of the appended claims the invention may be practiced otherwise than as specifically described.

What is claimed is:

1. A heat-hardenable dispersion of a finely divided solid resin in liquid etherified methylolaminotriazine in which liquid the degree of methylolation averages at least about 50 percent, the degrees of etherification of the methylol groups averages at least about 70%, and about 20 to 80 mol percent of the etherifying groups are alkyl groups with up to 2 carbon atoms, the remaining etherifying groups being alkoxyethyl groups having alkoxy moieties with up to 4 carbon atoms;

the resin being an uncured mixture of about 30 to about 45% by weight of a polyester condensate with an average molecular weight about 500 to about 6000, an acid number below about 20, an OH number about 400 to about 800 and a softening temperature about 80° to about 150°C, the balance of the resin being essentially a polyurethane-forming polyisocyanate at least about half of whose isocyanate groups are masked with a lactam-masking agent that unmasks on heating to curing temperature;

the polyester condensate being essentially the polyester of (a) a mixture of isophthalic and terephthalic acids in which about 10 to about 90 mol percent is isophthalic acid, and (b) at least one saturated aliphatic polyol having 4 to 6 OH groups;

and the resin being present in an amount from about 20 to about 500% by weight of the liquid.

2. The combination of claim 1 in which the liquid is essentially a mixture of etherified methylolated triamino triazines and the polyester condensate is the polyester of the phthalic acids and the polyol as well as of at least one alkylene glycol whose hydroxyl groups are on non-adjacent carbons, the glycol content being not over about 30 mol percent of the total polyol, and the dispersion also contains an effective amount of a urethane-forming accelerator.

3. The combination of claim 1 in which the polyester has a molecular weight of about 1200 to about 2500.

4. The combination of claim 1 in which the polyester has an acid number of about 1 to about 5.

5. The combination of claim 2 in which the polyester has an OH number of about 600 to about 700.

6. The combination of claim 1 in which the masking is with epsilon-caprolactam.

7. The combination of claim 1 in which the polyol is pentaerythritol.

8. The combination of claim 2 in which the glycol is hexanediol-1,6.

9. The combination of claim 1 in which the urethane-forming polyisocyanate is selected from the class consisting of hexamethylene diisocyanate, methylcyclohexylene-2,4-diisocyanate, toluylene diisocyanate and 3-isocyanatomethyl-3,5,5-trimethylcyclohexylisocyanate.

10. The combination of claim 1 in which the resin is present in an amount from about 30 to about 250% by weight of the liquid.

11. The combination of claim 1 in which the liquid phase consists of etherified hexamethylol melamines.

12. The combination of claim 1 in which the liquid phase consists of etherified pentamethylol melamines.

13. The combination of claim 1 in which the methylolation degree of the liquid phase is at least 75%.

14. The combination of claim 2 in which the dispersion also includes dispersed pigment.

* * * * *